(12) United States Patent
Doddaiah

(10) Patent No.: US 11,144,403 B2
(45) Date of Patent: Oct. 12, 2021

(54) APERIODIC SNAPSHOT CREATION RECOMMENDATION ENGINE

(71) Applicant: EMC IP HOLDING COMPANY LLC, Hopkinton, MA (US)

(72) Inventor: Ramesh Doddaiah, Westborough, MA (US)

(73) Assignee: Dell Products L.P., Hopkinton, MA (US)

(*) Notice: Subject to any disclaimer, the term of this patent is extended or adjusted under 35 U.S.C. 154(b) by 149 days.

(21) Appl. No.: 16/689,133

(22) Filed: Nov. 20, 2019

(65) Prior Publication Data

US 2021/0149770 A1    May 20, 2021

(51) Int. Cl.
*G06F 12/00* (2006.01)
*G06F 11/14* (2006.01)
*G06F 16/11* (2019.01)
*G06F 3/06* (2006.01)
*G06N 20/00* (2019.01)

(52) U.S. Cl.
CPC ........ *G06F 11/1461* (2013.01); *G06F 3/065* (2013.01); *G06F 3/0605* (2013.01); *G06F 3/067* (2013.01); *G06F 11/1448* (2013.01); *G06F 16/128* (2019.01); *G06N 20/00* (2019.01)

(58) Field of Classification Search
CPC ............ G06F 11/1461; G06F 11/1448; G06F 16/128; G06F 3/0605; G06F 3/065; G06F 3/067; G06N 20/00
See application file for complete search history.

(56) References Cited

U.S. PATENT DOCUMENTS 8,341,121 B1 * 12/2012 Claudatos ........... G06F 11/1461
                                                              707/640

* cited by examiner

*Primary Examiner* — Shawn X Gu
(74) *Attorney, Agent, or Firm* — Anderson Gorecki LLP

(57) ABSTRACT

An aperiodic snapshot recommendation engine running in a storage system aperiodically generates hints that a new snapshot should be created. The hints are sent to host servers to prompt snapshot generation commands to be sent to the storage system. The hints may be generated based on current storage system workload conditions using a model of a snapshot scheduler running on a host server for which the storage system maintains data. The model may be created using a machine learning technique. For example, machine learning may be used to model the host's snapshot scheduler in terms of storage system workload conditions existing when the snapshot scheduler commands generation of new snapshots during a training phase.

17 Claims, 3 Drawing Sheets

APERIODIC SNAPSHOT CREATION RECOMMENDATION ENGINE

TECHNICAL FIELD

The subject matter of this disclosure is generally related to data storage systems, and more particularly to creation of snapshots.

BACKGROUND

SANs (Storage Area Networks) and NAS (Network-Attached Storage) are examples of data storage systems that are used to maintain large data sets associated with critical functions for which avoidance of data loss and maintenance of data availability are important. Techniques for avoiding data loss and maintaining data availability include creation of remote and local backups and replicas. Creating a complete copy of a data set may require a significant amount of time and resources so it is common practice to create smaller incremental updates known as snapshots or "snaps." Each snap only represents changes to the data set since some prior point in time, e.g. and without limitation since creation of the previous snap. Consequently, snaps take less time and resources to generate than complete copies. Moreover, snaps allow recreation of the state of the data set at a prior point in time.

Snapshot creation is typically initiated by a host server. For example, a script running on the host server may periodically prompt generation of a command that is sent to the storage system to cause a new snapshot to be created. The time period between sending the commands, and thus between generating new snapshots, may be selected based in part on the type of data that is in the dataset being snapped. For example, a new snap may be created every 10 minutes for datasets that include databases and OLTP (Online Transaction Processing) data, and only once per day for other types of datasets. However, those time periods are just examples and storage administrators often heuristically determine the time period based on personal knowledge and experience.

SUMMARY

All examples, aspects and features mentioned in this document can be combined in any technically possible way.

In accordance with some implementations an apparatus comprises: a storage system comprising at least one computing node that manages access to a plurality of non-volatile drives, the storage system comprising a snapshot recommendation engine that aperiodically generates a message indicating that a new snapshot should be created, the message being sent to a host server, thereby prompting the host server to send a command to the storage system to cause a new snapshot to be created. In some implementations the host server comprises a periodic snapshot scheduler and the snapshot recommendation engine generates a model of the periodic snapshot scheduler using features associated with storage system workload. In some implementations the snapshot recommendation engine generates the message indicating that the new snapshot should be created based on storage system workload since a most recent snapshot. In some implementations the host server comprises an aperiodic snapshot scheduler and the snapshot recommendation engine generates a model of the aperiodic snapshot scheduler using features associated with storage system workload. In some implementations the snapshot recommendation engine generates the message indicating that the new snapshot should be created based on storage system workload since a most recent snapshot. In some implementations the host server comprises an aperiodic snapshot scheduler and the snapshot recommendation engine generates a model of the aperiodic snapshot scheduler that predicts at least one of time of day and day of week at which new snapshots should be created. In some implementations the snapshot recommendation engine generates the message indicating that the new snapshot should be created based on the predicted time of day or day of week.

In accordance with some implementations a method comprises: using a storage system comprising at least one computing node that manages access to a plurality of non-volatile drives: using a model to determine that a new snapshot should be created aperiodically; generating a message indicating that the new snapshot should be created; sending the message to a host server, thereby prompting the host server to send a command to the storage system to cause the new snapshot to be created; and responsive to the command, creating the new snapshot. In some implementations the host server comprises a periodic snapshot scheduler and the method comprises the snapshot recommendation engine generating a model of the periodic snapshot scheduler using features associated with storage system workload. Some implementations comprise the snapshot recommendation engine generating the message indicating that the new snapshot should be created based on storage system workload since a most recent snapshot. In some implementations the host server comprises an aperiodic snapshot scheduler and the method comprises the snapshot recommendation engine generating a model of the aperiodic snapshot scheduler using features associated with storage system workload. Some implementations comprise the snapshot recommendation engine generating the message indicating that the new snapshot should be created based on storage system workload since a most recent snapshot. In some implementations the host server comprises an aperiodic snapshot scheduler and the method comprises the snapshot recommendation engine generating a model of the aperiodic snapshot scheduler that predicts at least one of time of day and day of week at which new snapshots should be created. Some implementations comprise the snapshot recommendation engine generating the message indicating that the new snapshot should be created based on the predicted time of day or day of week.

In accordance with some implementations a computer program product on a non-transitory computer-readable medium comprises: a model that determines when a new snapshot should be created aperiodically; instructions that generate a message indicating that the new snapshot should be created, the message being sent to a host server, thereby prompting the host server to return a command to cause the new snapshot to be created; and instructions responsive to the command to create the new snapshot. In some implementations the host server comprises a periodic snapshot scheduler and the computer program product comprises instructions that generate the model by modeling the periodic snapshot scheduler using features associated with storage system workload. Some implementations comprise instructions that generate the message do so based on storage system workload since a most recent snapshot. In some implementations the host server comprises an aperiodic snapshot scheduler and the computer program product comprises instructions that generate the model of the aperiodic snapshot scheduler based on storage system workload. Some implementations comprise instructions that generate the message based on storage system workload since a most recent snapshot. In some implementations the host server comprises an aperiodic snapshot scheduler and the computer program product comprises instructions that generate the model of the aperiodic snapshot scheduler by modeling at least one of time of day and day of week at which new snapshots should be created.

Although no advantages should be viewed as limitations to the inventive aspects, some implementations enhance resource utilization efficiency by prompting generation of new snaps based on workload rather than a fixed time period. Prompting generation of new snaps based on workload may also help to avoid leaving relatively large amounts of changed data unsnapped while a fixed time period runs.

Other aspects, features, and implementations may become apparent in view of the detailed description and figures.

DETAILED DESCRIPTION

Figure 1:
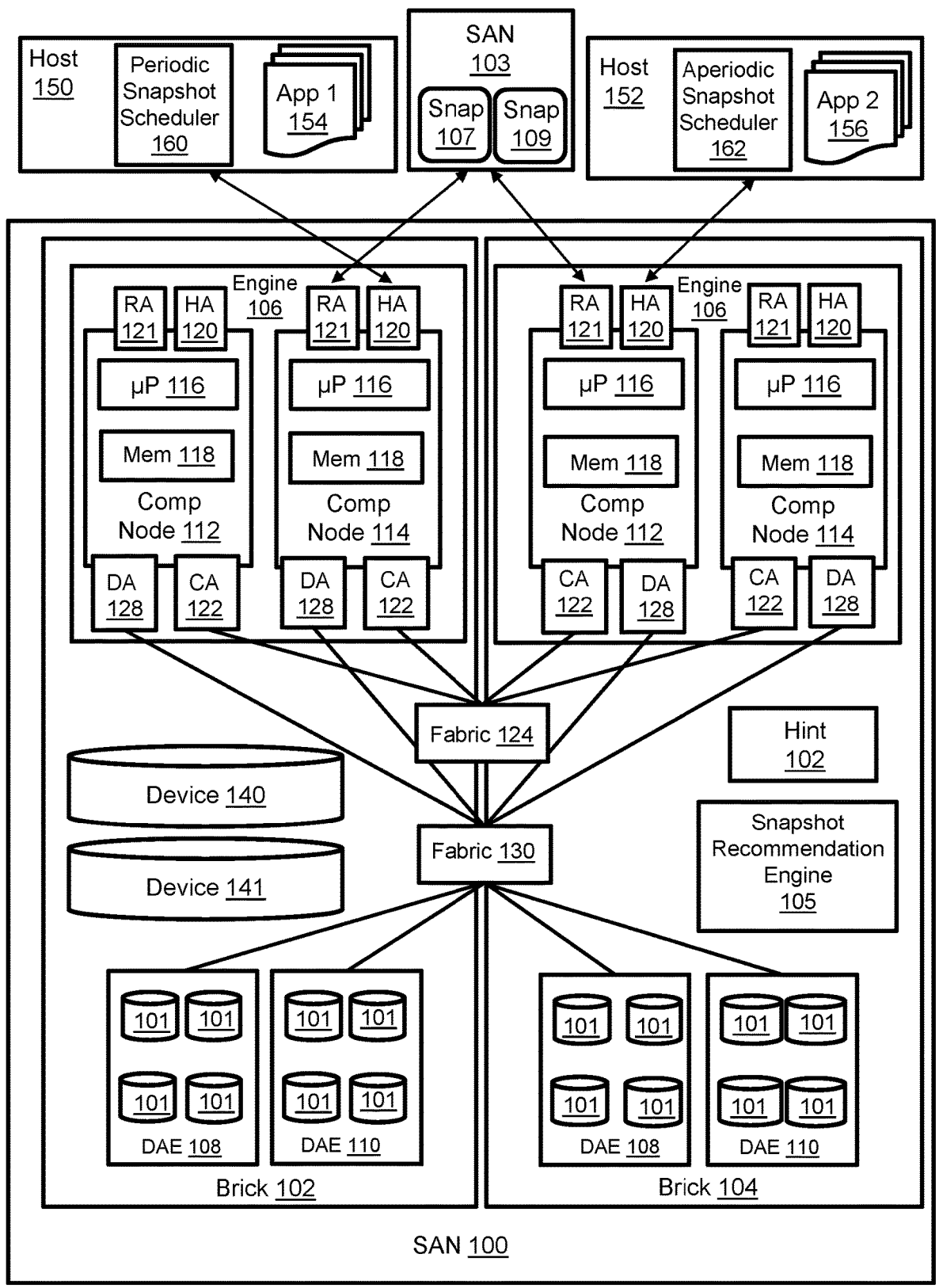
FIG. 1 illustrates a storage system that includes a SAN with a snapshot recommendation engine.

Aspects of the inventive concepts are described as being implemented in a data storage system that includes a host server and SAN. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

In the present disclosure a periodic snapshot scheduler includes logic that prompts generation of new snaps of a dataset using a single fixed period of time that defines the interval between successive snaps. The single fixed period of time may be selected based on storage administrator knowledge and experience, as is known in the art. The inventor has recognized that while using a fixed interval between successive snaps may be appropriate for average workloads, problems may be created by greater or lesser than average workloads. For example, an above-average workload associated with a burst of WRITE activity may result in generation of more changed data than is safe to maintain un-snapped until the end of the current snap generation period, where safety is a measure of chance of data loss. Moreover, above-average workloads may result in creation of unusually large snaps that may hinder data mining by altering the temporal resolution at which earlier point-in time state of the dataset can be recreated. Creation of a new snap at the end of a fixed interval when a below-average workload has been encountered may be unnecessary (for avoidance of data loss), disruptive and inefficient. All dirty data associated with a source device (or storage group or some other dataset) is force-flushed from cache to persistent storage to prepare for generation of a new snap. The dirty data in the cache represents changes to the source device that are not present in persistent storage, e.g. as a result of WRITE operations. The process of force-flushing all the dirty data to persistent storage can take considerable time to complete and neither the snap nor the source device is available for IOs during the force flushing process. As will be explained below, creation of aperiodic snapshots may help to alleviate some of these problems.

FIG. 1 illustrates a storage system that includes a SAN 100 with a snapshot recommendation engine 105 that helps to schedule aperiodic generation of new snaps. The snapshot recommendation engine may send snap generation hints such as hint 102 to a host server such as host 150 or host 152 based on the SAN workload. The snapshot recommendation engine may use a machine learning model of the snapshot scheduler operated by the host to determine when to generate hints. In some implementations the snapshot recommendation engine calculates the SAN workload conditions at which new snaps should be generated using a model generated by using received snap generation commands from a snapshot scheduler of a host and SAN workload statistics during training.

The SAN 100, which may be referred to as a storage array, includes one or more bricks 102, 104. Each brick includes an engine 106 and one or more DAEs (drive array enclosures) 108, 110. Each drive array enclosure includes managed drives 101 of one or more technology types. Examples may include, without limitation, SSDs such as flash and HDDs with spinning disk storage media. Each drive array enclosure might include 24 or more managed drives, but the figure is simplified. Each engine 106 includes a pair of interconnected computing nodes 112, 114, which may be referred to as "storage directors." Each computing node includes resources such as at least one multi-core processor 116 and local memory 118. The processor may include CPUs (Central Processing Units), GPUs (Graphics Processing Units), or both. The local memory 118 may include volatile RAM (Random-Access Memory) of any type, NVM (Non-Volatile Memory) such as SCM (Storage Class Memory), or both. Each computing node includes one or more HAs (host adapters) 120 for communicating with the hosts 150, 152. Each host adapter has resources for servicing IOs, e.g. processors, volatile memory, and ports via which the hosts may access the SAN node. Each computing node also includes an RA (remote adapter) 121 for communicating with other storage systems such as SAN node 103. Each computing node also includes one or more DAs (drive adapters) 122 for communicating with the managed drives 101 in the disk array enclosures 108, 110. Each drive adapter has resources for servicing IOs, e.g. processors, volatile memory, and ports via which the computing node may access the drive array enclosures. Each computing node may also include one or more CAs (channel adapters) 122 for communicating with other computing nodes via an interconnecting fabric 124. An OS 107 running on the SAN has resources for servicing IOs and supports a wide variety of other functions. Each computing node may allocate a portion or partition of its respective local memory 118 to a shared memory that can be accessed by other computing nodes, e.g. via DMA (Direct Memory Access) or RDMA (Remote DMA). The paired computing nodes 112, 114 of each engine 106 provide failover protection and may be directly interconnected by communication links. An interconnecting fabric 130 enables implementation of an N-way active-active backend. A backend connection group includes all drive adapters that can access the same drive or drives. In some implementations every drive array 128 in the storage array can reach every disk array enclosure via the fabric 130. Further, in some implementations every drive adapter in the SAN can access every managed drive 101 in the SAN. The snapshot recommendation engine 105 may include program code stored in the memory 118 of the computing nodes and executed by the processors 116 of the computing nodes.

Data associated with host applications 154, 156 running on the hosts 150, 152 is maintained on the managed drives 101. The managed drives 101 are not discoverable by the hosts 150, 152 but the SAN 100 creates logical storage devices 140, 141 that can be discovered and accessed by the hosts. Without limitation, the logical storage devices may be referred to as "source devices" or simply "devices" for snap creation, and more generally as production volumes, production devices, or production LUNs, where LUN (Logical Unit Number) is a number used to identify logical storage volumes in accordance with the SCSI (Small Computer System Interface) protocol. In the illustrated example logical storage device 140 is used by instances of host application 154 for storage of host application data and logical storage device 141 is used by instances of host application 156 for storage of host application data. From the perspective of the hosts 150, 152 each logical storage device is a single drive having a set of contiguous fixed-size LBAs (logical block addresses) on which data used by instances of the host application resides. However, the host application data is stored at non-contiguous addresses on various managed drives 101.

To service IOs from instances of a host application the SAN 100 maintains metadata that indicates, among various things, mappings between LBAs of the logical storage devices 140, 141 and addresses with which extents of host application data can be accessed from the shared memory and managed drives 101. In response to a data access command from an instance of one of the host applications to READ data from the production volume 140 the SAN uses the metadata to find the requested data in the shared memory or managed drives. When the requested data is already present in memory when the command is received it is considered a "cache hit." When the requested data is not in the shared memory when the command is received it is considered a "cache miss." In the event of a cache miss the accessed data is temporarily copied into the shared memory from the managed drives and used to service the IO, i.e. reply to the host application with the data via one of the computing nodes. In the case of a WRITE to one of the production volumes the SAN copies the data into the shared memory, marks the corresponding logical storage device location as dirty in the metadata, and creates new metadata that maps the logical storage device address with a location to which the data is eventually written on the managed drives. READ and WRITE "hits" and "misses" occur depending on whether the stale data associated with the IO is present in the shared memory when the IO is received.

SAN 103 maintains replicas or backups of the logical devices 140, 141. Snap 107 and snap 109 respectively are created for the logical devices 140, 141 in furtherance of maintaining the replicas or backups remotely on SAN 103. Each snap is a consistent point-in-time persistent storage copy of a storage object such as source devices 140, 141. Multiple snaps may be generated over time, and each snap may be an incremental copy that only represents changes to the source device since some prior point in time, e.g. and without limitation since creation of the previous snap. For example, a first snap could be created at time t=0 and a second snap could be created at time t=1, where the second snap represents only the changes since the first snap was created. A snap that is a complete copy of the source device at some point in time may be referred to as a clone. Clones may be created to provide prior point in time versions of the source device where the source device is updated with each change. A wide variety of different types of snaps may be implemented, and the term snap is used herein to refer to both incremental and complete copies.

The hosts may include periodic snapshot schedulers, aperiodic snapshot schedulers, or both. Further, a snapshot scheduler may include both a periodic mode and an aperiodic mode and may be switched between modes. In this disclosure a periodic snapshot scheduler includes logic that prompts generation of new snaps of an associated dataset using a single fixed period of time that defines the interval between successive snaps. An aperiodic snapshot scheduler includes logic that prompts generation of new snaps of an associated dataset without being limited to a single interval. For example, an aperiodic snapshot scheduler may prompt snap generation based on SAN workload statistics or time of day and day of week. Although the internal logic of a periodic snapshot scheduler is limited to a single interval, the periodic snapshot scheduler can generate snapshot commands that are aperiodic in response to external logic and signaling, e.g. from the SAN. In the illustrated example host 150 includes a periodic snapshot scheduler 160 and host 152 includes an aperiodic snapshot scheduler 162. The periodic snapshot scheduler 160 sends commands to cause the SAN to generate new snaps at a fixed time interval such as 10 minutes or 24 hours. The aperiodic snapshot scheduler 162 sends commands to cause the SAN to generate new snaps when predetermined workload conditions are met or at predetermined times of the day and days of the week. The workload conditions may be defined by one or more characteristics selected from: total number of WRITES since most recent snap, sizes of WRITES since most recent snap, percentage of WRITES since most recent snap that are compressed, compression ratio of WRITES since most recent snap that are compressed, percentage of WRITES since most recent snap that are deduplicated, optimal compression ratio for new WRITE, optimal deduplication ratio for new writes, WRITE burst activity since most recent snap or within a time window and frequency of individual WRITE bursts, time series of new WRITE activity in the time window. For example, threshold values could be assigned for each characteristic and meeting or exceeding a threshold for any characteristic could trigger generation of a command to create a new snap.

Figure 2:
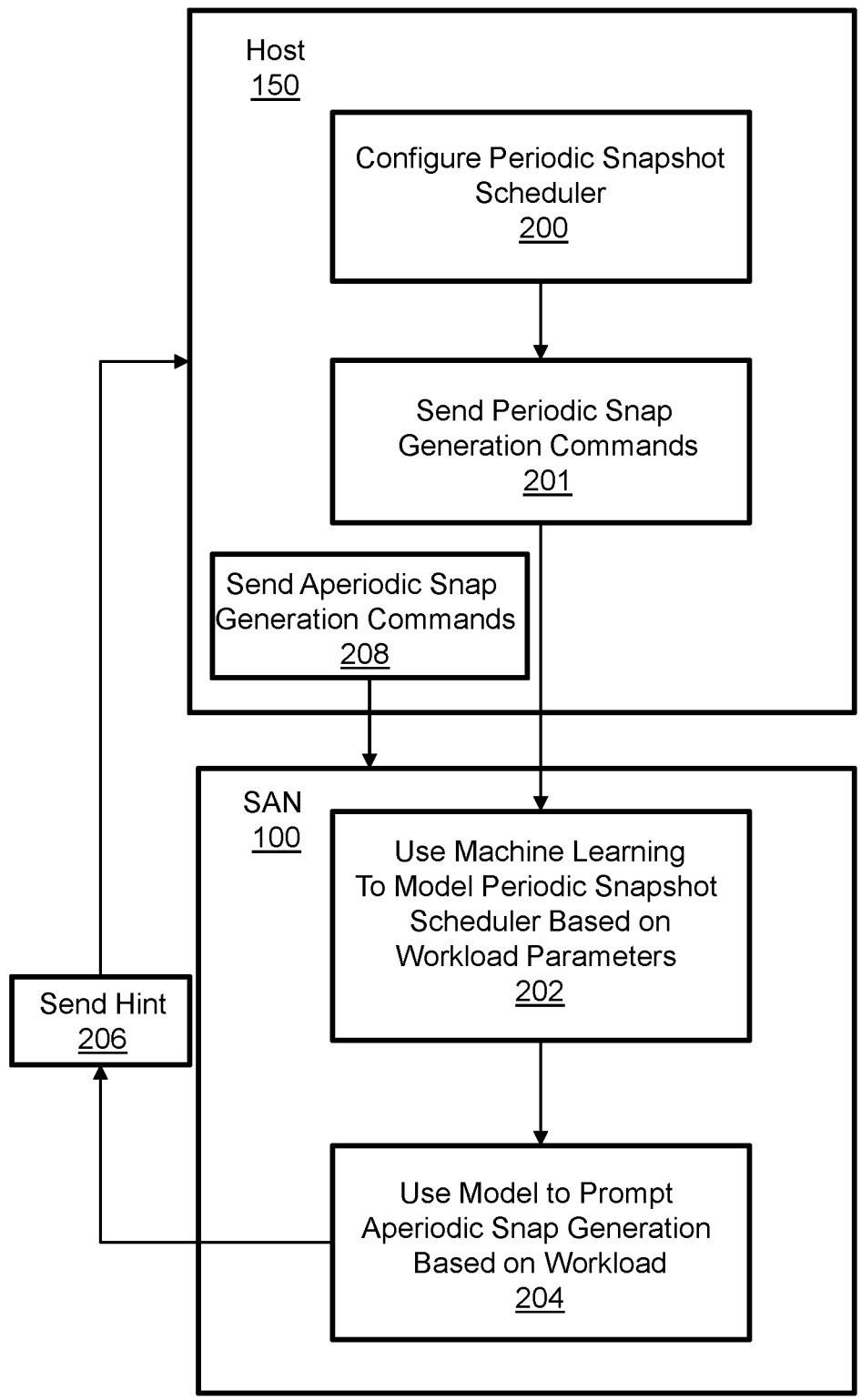
FIG. 2 illustrates operation of the snapshot recommendation engine with a periodic snapshot scheduler.

FIG. 2 illustrates operation of the snapshot recommendation engine with the host that uses the periodic snapshot scheduler. The periodic snapshot scheduler operated by host 150 is configured as indicated in step 200. Configuring the periodic snapshot scheduler includes selecting a fixed time period corresponding to a single interval of time at which the scheduler's logic determines that a new snap should be generated. The fixed time period may be selected based on storage administrator knowledge and experience. For example, a time period of 10 minutes may be selected for datasets that include databases and OLTP data, whereas a time period of once per day may be selected for other types of datasets. The host 150 sends periodic snapshot generation commands to the SAN 100 in accordance with the scheduler configuration as indicated in step 201. The snapshot recommendation engine of SAN 100 generates a model of the periodic snapshot scheduler as indicated in step 202. The model may be generated via machine learning by using SAN workload and timestamped snap generation commands received from the host as features during training. The SAN workload features may include one or more of total number of WRITES since most recent snap, sizes of WRITES since most recent snap, percentage of WRITES since most recent snap that are compressed, compression ratio of WRITES since most recent snap that are compressed, percentage of WRITES since most recent snap that are deduplicated, optimal compression ratio for new WRITE, optimal deduplication ratio for new writes, WRITE burst activity since most recent snap or within a time window and frequency of individual WRITE bursts, time series of new WRITE activity in the time window. The machine learning model may correlate the SAN workload features with the timing of new snapshot generation commands received from the host, and thus recognize the SAN workload conditions that exist at the end of each snap generation interval used in the training dataset. The machine learning model is then used to prompt aperiodic snapshot generation based on current SAN workload as indicated in step 204 by sending hints to the host as indicated in step 206. Current SAN workload conditions are monitored by the SAN and provided to the snapshot recommendation engine. In some implementations the snapshot recommendation engine sends a hint message to the host when the model indicates that a new snap should be generated under the current workload conditions (since the most recent snap), e.g. because the current workload conditions are equivalent to workload conditions associated with generation of new snaps in the training dataset. The host is responsive to the hints to send snapshot generation commands to the SAN as indicated in step 208. The snapshot generation commands from step 208 are aperiodic because the hints are aperiodically sent to the host based on current workload conditions provide to the recommendation engine. The periodic snapshot scheduler may still prompt generation of a new snap at the end of the current interval so both periodic and aperiodic snaps may be generated for the same dataset. In some implementations the snapshot recommendation engine causes the SAN to generate a new snap without interaction with the host.

Training the machine learning model with average SAN workloads for which the fixed time period for generating new snaps is appropriate results in generation of a model that prompts generation of new snaps when above average workloads are encountered, even if the fixed interval of the snapshot scheduler has not expired. Further, the model will not necessarily prompt generation of new snaps at the expiration of the fixed interval when below average workloads are encountered. The periodic snapshot scheduler at the host may continue to send snap generation commands at the end of each interval or be partly disabled in order to rely solely on the snapshot recommendation engine, thereby generating new snaps based only on current workload since the most recent snapshot.

Figure 3:
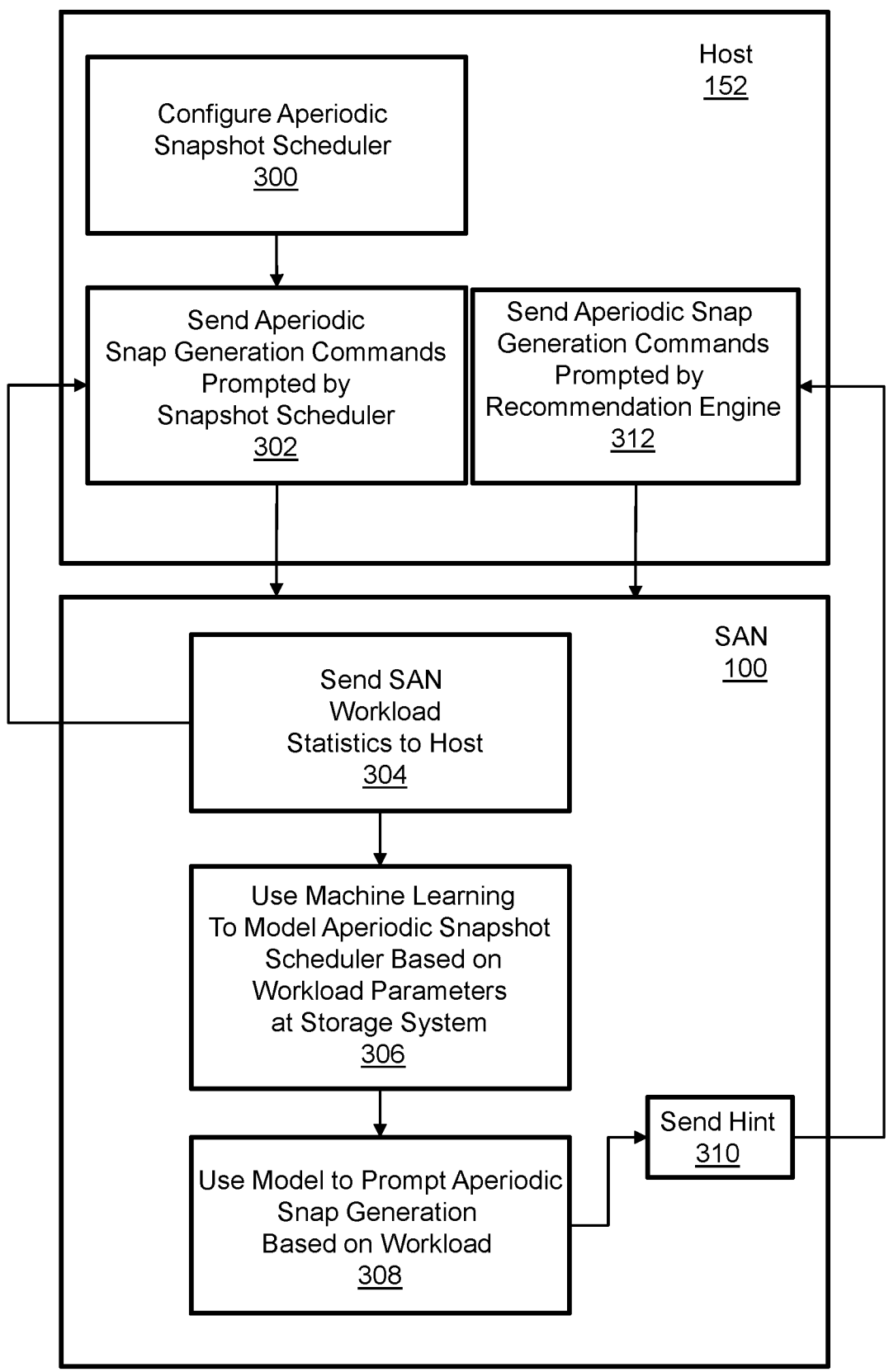
FIG. 3 illustrates operation of the snapshot recommendation engine with an aperiodic snapshot scheduler.

FIG. 3 illustrates operation of the snapshot recommendation engine with the host 152 that uses an aperiodic snapshot scheduler. The aperiodic snapshot scheduler operated by the host is configured as indicated in step 300 with SAN workload conditions that trigger generation of a new snap. The SAN workload conditions may include one or more of total number of WRITES since most recent snap, sizes of WRITES since most recent snap, percentage of WRITES since most recent snap that are compressed, compression ratio of WRITES since most recent snap that are compressed, percentage of WRITES since most recent snap that are deduplicated, optimal compression ratio for new WRITE, optimal deduplication ratio for new writes, WRITE burst activity since most recent snap or within a time window and frequency of individual WRITE bursts, time series of new WRITE activity in the time window. Current SAN workload conditions are sent from the SAN 100 to the host 152 as indicated in step 304, e.g. periodically or in response to commands from the host. When the current SAN workload conditions match the configured SAN workload conditions, e.g. being equal or greater in one or more features, the host sends a snap generation command to the SAN 100 as indicated in step 302. The snapshot recommendation engine of SAN 100 generates a model of the aperiodic snapshot scheduler as indicated in step 306. The model is generated based on timing of received snap generation commands and current SAN workload that may include features such as one or more of total number of WRITES since most recent snap, sizes of WRITES since most recent snap, percentage of WRITES since most recent snap that are compressed, compression ratio of WRITES since most recent snap that are compressed, percentage of WRITES since most recent snap that are deduplicated, optimal compression ratio for new WRITE, optimal deduplication ratio for new writes, WRITE burst activity since most recent snap or within a time window and frequency of individual WRITE bursts, time series of new WRITE activity in the time window. The snapshot recommendation engine may analyze the workload features occurring in time windows of various sizes and predict the best fixed-size time window to fit the model of the aperiodic scheduler. Different time windows may be predicted for different times of day and days of the week.

The machine learning model is then used to prompt aperiodic snapshot generation based on current SAN workload as indicated in step 308 by sending hints to the host as indicated in step 310. Current SAN workload conditions are monitored by the SAN and provided to the snapshot recommendation engine. In some implementations the snapshot recommendation engine sends a hint message to the host when the model indicates that a new snap should be generated under the current workload conditions (since the mode recent snap). The host is responsive to the hints to send snapshot generation commands to the SAN as indicated in step 312. The snapshot generation commands from step 312 are aperiodic because the hints are aperiodically sent to the host based on current workload conditions provide to the recommendation engine. Once the model has been trained, the aperiodic snapshot scheduler at the host may be partly disabled such that snapshot are only generated in response to hints. In some implementations the snapshot recommendation engine causes the SAN to generate a new snap without interaction with the host.

A wide variety of machine learning techniques may be used to generate the models described above. Examples may include, but are not limited to, logistic regression, a random forest of decision trees, and LSTM (long short-term memory). Specific examples using each of these techniques are described below.

Logistic regression models probabilities for classification problems with two possible outcomes based on the relationship between one dependent binary variable and one or more nominal, ordinal, interval or ratio-level independent variables. The probabilities are modeled as the log odds of one of the outcomes occurring. In the snapshot recommendation engine, the outcome is generation of a new snap and the variables are the timestamped snap generation commands and SAN workload features. Regression coefficients (weights) may be estimated for each variable using a maximum likelihood estimation. The following is illustrative of a snapshot recommendation model created using logistic regression:

A Logarithm (probability of a new snapshot being generated now)=Latest number of total new WRITE IO's*weight_1+What was the (average) time-period historically between snapshots on this device*weight_2+Deduplication percentage of new WRITES*weight_3+Compression percentage of new WRITES on this device*weight_4+Compression ratio of new WRITES on this device*weight_5+Latest WRITE IO burst window for this device*weight_6+8 KB or less Write IO sizes in this new window*weight_7+16 KB write IO sizes in this new window*weight_8+64 KB or more write IO sizes in this new window*weight_9+Expected change in red hot or cold data temperature for the given device from write IO perspective*weight_10

After creating the logistic regression model, the snapshot recommendation engine iteratively recalculates the probability of taking a new snapshot using the model with current SAN workload as input. A hint is sent to the host when the probability reaches a predetermined threshold value. A WRITE burst, for example, might exponentially increase the calculated probability of generating a new snapshot based on historic average time windows. The probability of generating a new snapshot would also increase in response to receipt of WRITEs of different sizes, e.g. 128 KB or 64 KB instead of 8 KB or 16 KB. However, if a deduplication feature indicates that most of the new WRITEs were deduped then the probability is not significantly increased, which is a reasonable result because there is little value in snapping duplicated data. For an OLTP/DB (database) dataset having only 8 KB or 16 KB IO sizes for the given device, a change in WRITE size will increase the probability of generation of a new snapshot being generated, which is a reasonable result because it reduces the probability of data loss by creating more backups.

A decision tree models an outcome in terms of sequential questions that lead to different paths from a root node to one of a plurality of leaf nodes via branch nodes. The depth of the tree is the number of branch nodes traversed to reach a leaf node. One drawback of decision trees is that the likelihood of overfitting increases with depth. This problem may be mitigated by using a random forest of decision trees.

A random forest aggregates the results from a collection of decision trees into a single result. The features modeled by the decision trees may be randomly assigned. In the snapshot recommendation engine, the features may include the received snapshot generation commands and SAN workload condition features. For example, the decision trees may be built using randomly assigned features selected from the latest number of new WRITEs to a given dataset, the average time-period historically between snapshots for the dataset, deduplication and compression percentages of new WRITES for the dataset, compression ratio of new WRITES to the dataset, latest WRITE IO burst window for the dataset, 8 KB or less Write IO sizes in this new window for the dataset, 16 KB write IO sizes in this new window for the dataset, 64 K or more write IO sizes in this new window for the dataset, and expected change in "hot" or "cold" data temperature for the given dataset from WRITE IO perspective, where hot and cold are indicative of frequency and recency of WRITEs. Each decision tree uses only a subset of these features and no two trees use exactly the same set of features.

LSTM networks are a type of RNN (recurrent neural network) designed for learning long-term dependencies. In the snapshot recommendation engine, the LSTM predicts a time series and frequency for snapshot creation recommendation across different days and times of the day based on historical SAN workload and snapshot generation information. LSTM analyzes the SAN workload that occurred around the time of snapshot creation to correlate SAN workloads with days and times of the day. The correlation is used to predict the right days and times of day for future snapshot generation. LSTM inputs may include time-stamped snapshots and associated SAN workload conditions. The snapshot recommendation engine can examine the SAN's metadata to determine if certain types of IOs, certain sizes of IOs, and certain dates and times correlate with snapshot creation. The metadata indicates historical conditions associated with data in the shared memory and LBAs of the logical storage device, such as a burst of WRITE IOs following a READ IO, WRITE IO, or change in size of WRITE to specific shared memory addresses or LBAs. Mining the metadata for indications of updated metadata objects associated with previous snapshots for a given dataset enables efficient comparison of the metadata objects that were updated in the intervals preceding generation of consecutive snapshots of the device. The comparison yields patterns associated with SAN workload, such as READ or WRITE IO types, and different IO sizes that may correlate with temporal snap generation patterns across different days and times of the day. Features for the LSTM neural network for a dataset or logical device may include one or more of: LBA, LBC, device, READ or WRITE IO type, latest number of new writes, average, min and max time-period between snapshots, deduplication percentage of new WRITEs, compression percentage of new WRITEs, compression ratio of new WRITEs, latest WRITE IO burst window, 8 KB or less Write IO sizes in this new window, 16 KB write IO sizes in this new window, 64 KB or more write IO sizes in this new window, and expected change in hot or cold data temperature for the given dataset from a WRITE IO perspective. An example of pseudocode using LSTM for the snapshot recommendation engine may be as follows:

1. LSTM Training window is aligned to initial 10 minutes snapshot creation time window
2. Run predictions or recommendations using M
3. Calculate the loss function
4. For n-epochs and relevant batch-size do a. Train the Network to learn a model (M)
5. End for
6. Run predictions or snapshot creation recommendations using M
7. Calculate the loss function
8. The 10-minute training window is changed by LSTM prediction and becomes part of future input events Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
a storage system comprising at least one computing node that manages access to a plurality of non-volatile drives, the storage system comprising a snapshot recommendation engine that aperiodically generates a message indicating that a new snapshot should be created, the message being sent to a host server that comprises a periodic snapshot scheduler, wherein the snapshot recommendation engine generates a model of the periodic snapshot scheduler using features associated with storage system workload, thereby prompting the host server to aperiodically send a command to the storage system to cause a new snapshot to be created.

2. The apparatus of claim 1 wherein the snapshot recommendation engine generates the message indicating that the new snapshot should be created based on storage system workload since a most recent snapshot.

3. The apparatus of claim 1 wherein the host server comprises an aperiodic snapshot scheduler and the snapshot recommendation engine generates a model of the aperiodic snapshot scheduler using features associated with storage system workload.

4. The apparatus of claim 3 wherein the snapshot recommendation engine generates the message indicating that the new snapshot should be created based on storage system workload since a most recent snapshot.

5. The apparatus of claim 1 wherein the host server comprises an aperiodic snapshot scheduler and the snapshot recommendation engine generates a model of the aperiodic snapshot scheduler that predicts at least one of time of day and day of week at which new snapshots should be created.

6. The apparatus of claim 5 wherein the snapshot recommendation engine generates the message indicating that the new snapshot should be created based on the predicted time of day or day of week.

7. A method comprising:
using a storage system comprising at least one computing node that manages access to a plurality of non-volatile drives and a host server comprising a periodic snapshot scheduler:
using a snapshot recommendation engine generating a model of the periodic snapshot scheduler using features associated with storage system workload;
using the model to determine that a new snapshot should be created aperiodically;
aperiodically generating a message indicating that the new snapshot should be created;
sending the message to the host server, thereby prompting the host server to send a command to the storage system to cause the new snapshot to be created; and
responsive to the command, aperiodically creating the new snapshot.

8. The method of claim 7 comprising the snapshot recommendation engine generating the message indicating that the new snapshot should be created based on storage system workload since a most recent snapshot.

9. The method of claim 7 wherein the host server comprises an aperiodic snapshot scheduler and comprising the snapshot recommendation engine generating a model of the aperiodic snapshot scheduler using features associated with storage system workload.

10. The method of claim 9 comprising the snapshot recommendation engine generating the message indicating that the new snapshot should be created based on storage system workload since a most recent snapshot.

11. The method of claim 7 wherein the host server comprises an aperiodic snapshot scheduler and comprising the snapshot recommendation engine generating a model of the aperiodic snapshot scheduler that predicts at least one of time of day and day of week at which new snapshots should be created.

12. The method of claim 11 comprising the snapshot recommendation engine generating the message indicating that the new snapshot should be created based on the predicted time of day or day of week.

13. A computer program product on a non-transitory computer-readable medium, comprising:
instructions that generate a model of a periodic snapshot scheduler of a host server using features associated with storage system workload, wherein the model determines when a new snapshot should be created aperiodically;
instructions that aperiodically generate a message indicating that the new snapshot should be created, the message being sent to the host server, thereby prompting the host server to return a command to cause the new snapshot to be created; and
instructions responsive to the command to aperiodically create the new snapshot.

14. The computer program product on the non-transitory computer-readable medium of claim 13 wherein the instructions that generate the message do so based on storage system workload since a most recent snapshot.

15. The computer program product on the non-transitory computer-readable medium of claim 13 wherein the host server comprises an aperiodic snapshot scheduler and comprising instructions that generate the model based on storage system workload.

16. The computer program product on the non-transitory computer-readable medium of claim 15 wherein the instructions that generate the message do so based on storage system workload since a most recent snapshot.

17. The computer program product on the non-transitory computer-readable medium of claim 13 wherein the host server comprises an aperiodic snapshot scheduler and comprising instructions that generate the model by modeling at least one of time of day and day of week at which new snapshots should be created.

* * * * *